United States Patent
Decesaris et al.

(10) Patent No.: US 9,239,613 B2
(45) Date of Patent: *Jan. 19, 2016

(54) INTELLIGENT OVER-CURRENT PREVENTION

(71) Applicant: Lenovo Enterprise Solutions (Singapore) Pte. Ltd., Singapore (SG)

(72) Inventors: Michael Decesaris, Carrboro, NC (US); James J. Parsonese, Cary, NC (US); Luke D. Remis, Raleigh, NC (US); Gregory D. Sellman, Morrisville, NC (US); Steven L. Vanderlinden, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 507 days.

This patent is subject to a terminal disclaimer.

(21) Appl. No.: 13/864,592

(22) Filed: Apr. 17, 2013

(65) Prior Publication Data

US 2014/0310547 A1  Oct. 16, 2014

Related U.S. Application Data

(63) Continuation of application No. 13/861,882, filed on Apr. 12, 2013.

(51) Int. Cl.
  *G06F 1/32* (2006.01)
  *G06F 1/20* (2006.01)
  *G06F 1/26* (2006.01)

(52) U.S. Cl.
  CPC .............. *G06F 1/3296* (2013.01); *G06F 1/206* (2013.01); *G06F 1/26* (2013.01); *Y10T 307/406* (2015.04)

(58) Field of Classification Search
  CPC ......... G06F 1/3296; G06F 1/26; G06F 1/206; Y10T 307/406
  USPC ........................................................ 307/31
  See application file for complete search history.

(56) References Cited

U.S. PATENT DOCUMENTS 7,233,131 B2   6/2007   Lin et al.
7,741,820 B2   6/2010   Huang et al.
(Continued)

FOREIGN PATENT DOCUMENTS

CN   1558522 A   12/2004
CN   1909315 A    2/2007
(Continued)

OTHER PUBLICATIONS

International Searching Authority, International Search Report and Written Opinion for International Application No. PCT/IB2014/059388, Mailed Jun. 30, 2014.
(Continued)

*Primary Examiner* — Toan Vu
(74) *Attorney, Agent, or Firm* — Law Office of Jim Boice

(57) ABSTRACT

A system, method, and/or computer program product comprises an input/output (I/O) bus and an intelligent current bank that couples a voltage source to the I/O bus. The intelligent current bank includes an ammeter that measures a real-time flow of current to the I/O bus. In response to the current to the I/O bus exceeding a predetermined level, an intelligent Pulse-Width Modulator (iPWM) within the intelligent current bank selectively decreases current to one or more electronic devices on the I/O bus by shortening a duty cycle of voltage being received by the iPWM from the voltage source.

10 Claims, 5 Drawing Sheets

(56) References Cited

U.S. PATENT DOCUMENTS

| | | |
|---|---|---|
| 2008/0249666 A1 | 10/2008 | Buterbaugh et al. |
| 2009/0016216 A1* | 1/2009 | Ballard .................. B60R 16/03 370/230 |
| 2009/0167274 A1 | 7/2009 | Chien et al. |
| 2009/0189661 A1 | 7/2009 | Kao et al. |
| 2010/0327829 A1 | 12/2010 | Bucur et al. |
| 2012/0300947 A1 | 11/2012 | Lin et al. |

FOREIGN PATENT DOCUMENTS

| | | |
|---|---|---|
| CN | 202309053 A | 7/2012 |
| JP | 2004259431 A | 9/2004 |
| JP | 2007280606 A | 10/2007 |
| WO | 03023947 A1 | 3/2003 |

OTHER PUBLICATIONS

V. Constantin, "Dimming Power LEDS Using a Sepic Converter and MCP1631 PIC Attach PWM Controller", Microchip Technology Inc., pp. 1-22, 2009.

P. Wiener et al, "Meeting USB and IEEE 1394 Overcurrent Protection Requirements Using Polyswitch Devices", WESCON/97, Conference Proceedings, IEEE, pp. 442-475, 1997.

* cited by examiner

INTELLIGENT OVER-CURRENT PREVENTION

BACKGROUND

The present disclosure relates to the field of computing hardware, and specifically to hardware devices. Still more specifically, the present disclosure relates to a design structure for selectively controlling current level to hardware devices.

A Field Programmable Gate Array (FPGA) or an Application Specific Integrated Circuit (ASIC) may provide multiple Input/Output (I/O) current busses, which receive a voltage source from one or more power pins. That is, an FPGA/ASIC may include current banks, which take voltage source(s), converts this voltage into current, and supplies this current to one or more devices that are coupled to their respective I/O current busses.

SUMMARY

In one embodiment of the present invention, a system comprises a voltage source; an input/output (I/O) bus, wherein the input/output bus transmits current to and data from one or more electronic devices; and an intelligent current bank coupling the voltage source to the I/O bus. The intelligent current bank comprises an ammeter, where the ammeter measures a real-time flow of current through a resistance that is coupled to the voltage source; and an intelligent Pulse-Width Modulator (iPWM), wherein the iPWM couples the ammeter and the resistance to the I/O bus, and wherein the iPWM is constructed to: determine if the real-time flow of current through the resistance being measured by the ammeter exceeds a predetermined amount; and in response to determining that the real-time flow of current through the resistance being measured by the ammeter exceeds the predetermined amount, selectively decrease current to at least one of said one or more electronic devices, wherein current to said at least one of said one or more electronic devices is decreased by the iPWM by shortening a duty cycle of voltage being received by the iPWM from the voltage source.

In one embodiment of the present invention, a hardware description language (HDL) design structure is encoded on a machine-readable data storage medium. The HDL design structure comprises elements that, when processed in a computer-aided design system, generate a machine-executable representation of a system that comprises a voltage source; an input/output (I/O) bus, wherein the input/output bus transmits current to and data from one or more electronic devices; and an intelligent current bank coupling the voltage source to the I/O bus. The intelligent current bank comprises an ammeter, where the ammeter measures a real-time flow of current through a resistance that is coupled to the voltage source; and an intelligent Pulse-Width Modulator (iPWM), wherein the iPWM couples the ammeter and the resistance to the I/O bus, and wherein the iPWM is constructed to: determine if the real-time flow of current through the resistance being measured by the ammeter exceeds a predetermined amount; and in response to determining that the real-time flow of current through the resistance being measured by the ammeter exceeds the predetermined amount, selectively decrease current to at least one of said one or more electronic devices, wherein current to said at least one of said one or more electronic devices is decreased by the iPWM by shortening a duty cycle of voltage being received by the iPWM from the voltage source.

In one embodiment, a method controls current to one or more devices in a hardware system, where the hardware system comprises a voltage source, an input/output (I/O) bus, and an intelligent current bank coupling the voltage source to the I/O bus. An ammeter measures a real-time flow of current through a resistance that is coupled to the voltage source. An intelligent Pulse-Width Modulation (iPWM) unit within the intelligent current bank and the ammeter determine if the real-time flow of current through the resistance exceeds a predetermined amount. In response to the iPWM and the ammeter determining that the real-time flow of current through the resistance being measured by the ammeter exceeds the predetermined amount, current to at least one of one or more electronic devices coupled to the I/O bus is selectively decreased, where current to one or more of the electronic devices is decreased by the iPWM shortening a duty cycle of voltage being received by the iPWM from the voltage source.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
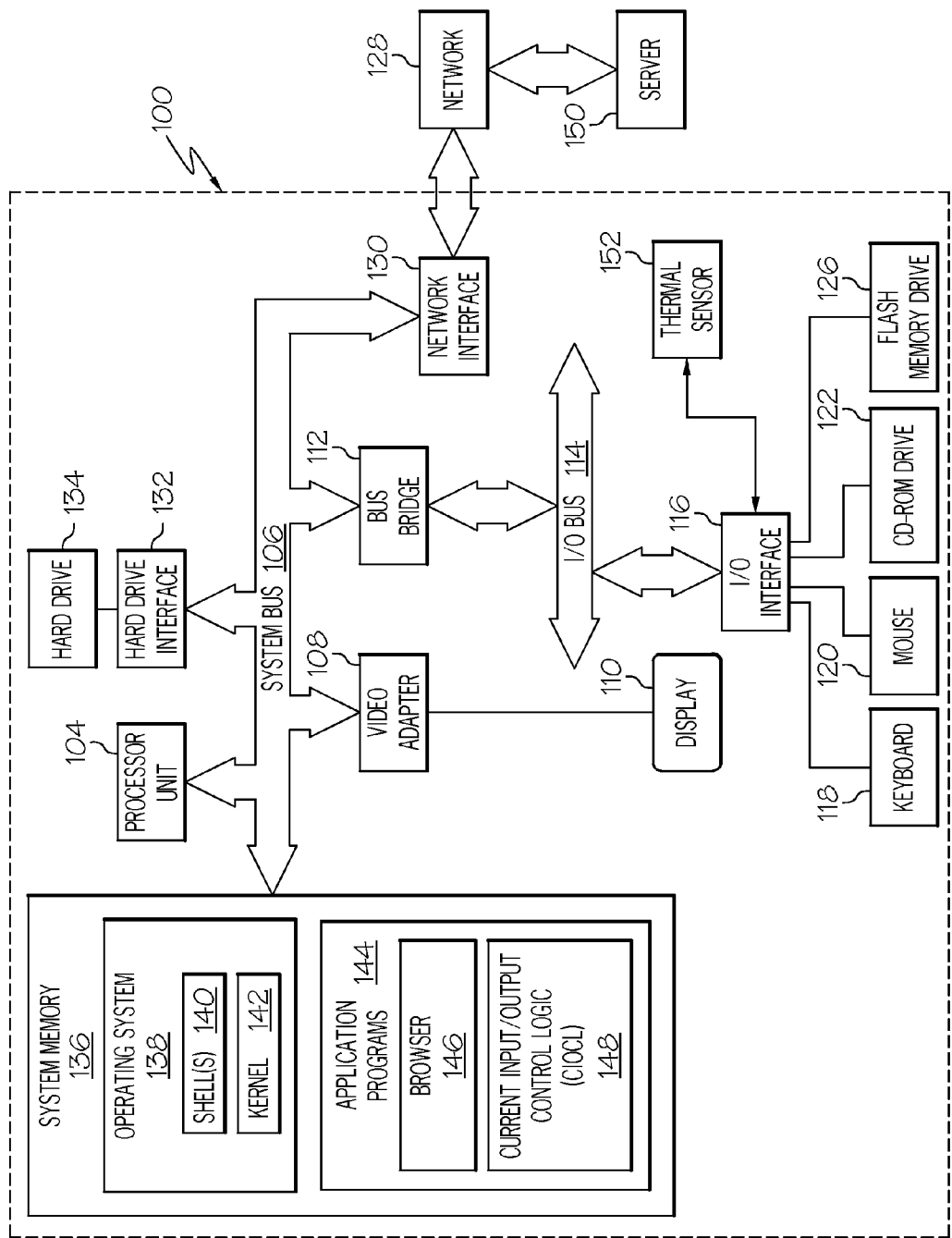
FIG. 1 depicts an exemplary physical computer in which the present invention may be implemented and/or utilized.

With reference now to FIG. 1, there is depicted a block diagram of an exemplary computer 100, with which and/or in which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk—Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Current Input/Output Control Logic (CIOCL) 148, which, in one embodiment, executes the process described below in FIG. 4 and/or FIG. 5. In one embodiment, computer 100 is able to download CIOCL 148 from service provider server 150, preferably in an "on demand" basis. Computer 100 also includes a thermal sensor 152, which is thermally coupled to a particular current bank, as depicted in exemplary detail below in FIG. 3.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
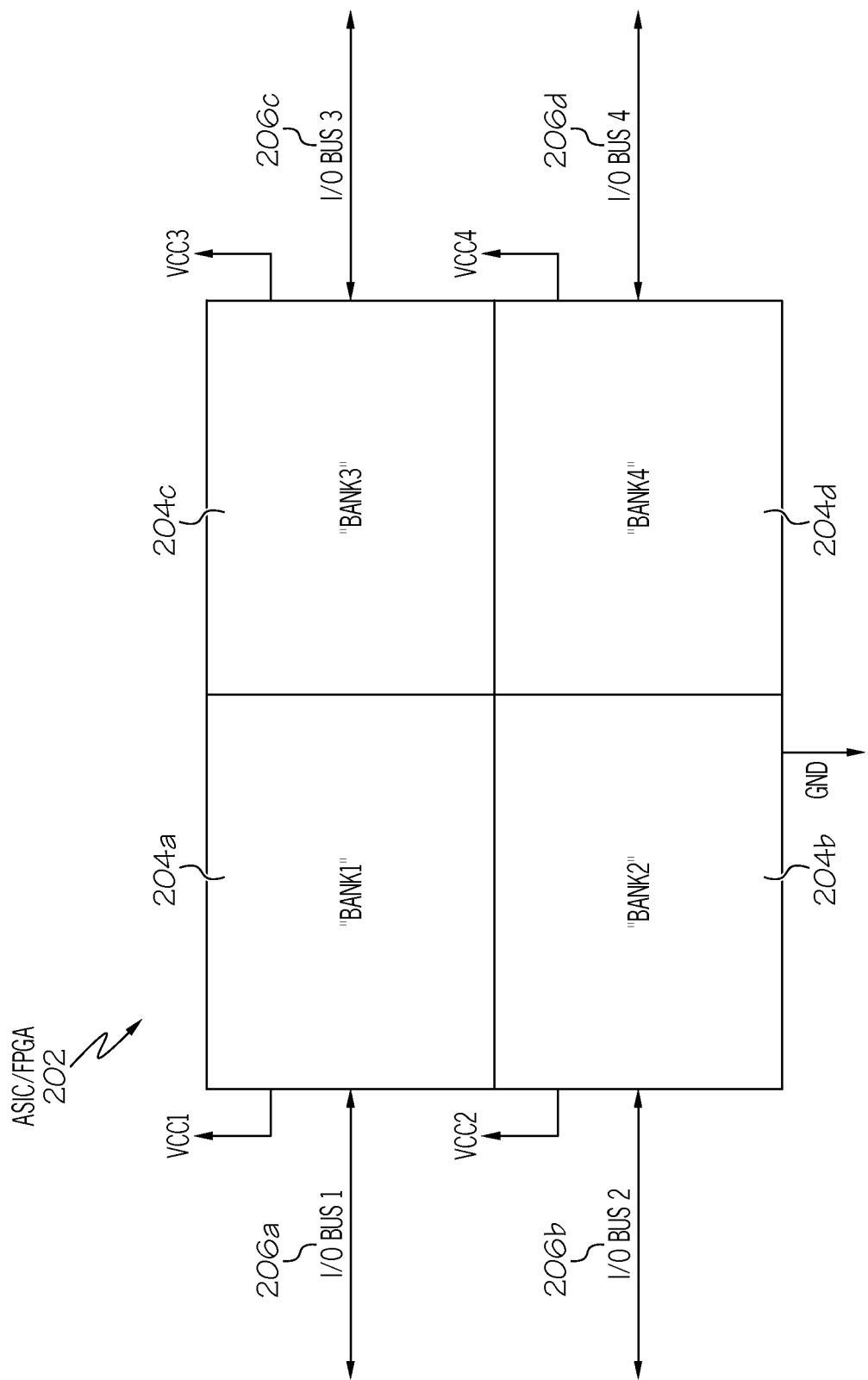
FIG. 2 illustrates an ASIC/FPGA having multiple current banks.

Referring now to FIG. 2, an exemplary Application Specific Integrated Circuit/Field Programmable Gate Array (ASIC/FPGA) 202 having multiple current banks, depicted as banks 204a-204d is illustrated. In one embodiment, ASIC/FPGA 202 is a component of I/O interface 116 depicted in FIG. 1. Banks 1-4 (i.e., current banks 204a-204d) each receive voltage from one or more of the voltage sources VCC1-VCC4. Each of the voltage sources VCC1-VCC4 supplies a fixed or variable amount of electronic voltage, which in one embodiment is within the range of 3.6 $V_{DC}$ to 15.0 $V_{DC}$. One or more of the voltage sources VCC1-VCC4 may be created by an Alternating Current/Direct Current (AC/DC) converter, which takes AC voltage from an AC power source and converts it into DC voltage (i.e., forming a DC voltage source). In one embodiment, one or more of the voltage sources VCC1-VCC4 is a battery.

Each of the banks 1-4 includes an input/output bus (I/O bus 1-I/O bus 4), depicted as elements 206a-206d. (Note that the I/O busses 206a-206d are not analogous to the I/O bus 114 depicted in FIG. 1. That is, the I/O bus 114 in FIG. 1 provides a connection to an I/O interface 116, which is analogous to the ASIC/FPGA 202 shown in FIG. 2. The I/O busses 206a-206d are current connections (and in one embodiment ancillary data connections) to/from the I/O interface 116 to one or more devices, which may be elements 118, 120, 122, 126 shown in FIG. 1, and/or to another device, such as a processor, memory, storage device, etc.). Each I/O bus includes one or more power (e.g., electric current) lines and/or one or more data lines, to which devices are connected. Thus, with reference to FIG. 3, additional detail of current bank 204d is presented. As depicted, I/O bus 4 (206d) emanates from current bank 204d. I/O bus 4 includes "n" number of power lines and/or "n" number of data lines. The power lines provide current from current bank 204d to devices 302a-302n, and the data lines provide data from devices 310a-310n to the current bank 204d. More specifically, an intelligent Pulse-Width Modulator (iPWM) 304 provides current to devices 302a-302n, and the devices 302a-302n provide control/feedback data to the iPWM 304. In one embodiment, a particular I/O bus (e.g., I/O bus 4) is made up of multiple power lines and/or multiple data lines, where each of the power and/or data lines is connected to a single electronic device from the multiple electronic devices 302a-302n. That is, device 302a may have its own power line and/or data line in I/O bus 4, device 302b may be connected to a different power line and/or data line in I/O bus 4, etc.

As depicted, current bank 204d is coupled to the voltage source VCC4. Voltage from VCC4 causes current to flow through a resistance, such as resistor 306. Resistor 306 provides a nominal level of resistance to cause the current produced by VCC4 to be at some manageable level (i.e., prevents a direct connection (i.e., a "short") from VCC4 to ground GND, which would likely cause the circuit to melt). This real-time current is measured by an ammeter 308, which is logically coupled to the iPWM 304. If the iPWM 304 determines, based on current readings form the ammeter 308, that the amount of current coming into the iPWM 304 (and thus out the I/O bus 4) exceeds some predetermined level, then the iPWM 304 consults with a table 310 of devices on the I/O bus 4 that are able to have their current lowered.

Based on the entries in the table 310, the iPWM 304 lowers the incoming voltage from VCC4 by shortening the duty cycle of the voltage. That is, assume that the voltage being received from VCC4 can be turned off and on (e.g., to create a square wave of voltage). The amount of time during which the voltage is turned on is known as a "duty cycle". By increasing the duty cycle, the overall voltage level is increased; by shortening the duty cycle, the overall voltage level is decreased. For example, consider voltage waveform 312, in which voltage is turned off and on up to the voltage level of VCC4. In voltage waveform 312, the duty cycles 314 (i.e., periods in which the voltage from VCC4 is turned on) are wide, resulting in an average voltage V1 that is close to the voltage provided by VCC4. However, in voltage waveform 316, the duty cycles 318 (i.e., periods in which the voltage from VCC4 is turned on) are narrow (i.e., periods in which the voltage from VCC4 is turn on are shorter than those shown in voltage waveform 312), resulting in an average voltage V2 that is much less than the voltage provided by VCC4.

Note that the devices 302a-302n may be one or more of various types of electronic devices, including, but not limited to: cooling fans used to cool a system and/or specific components thereof; Light Emitting Diodes (LEDs) used to indicate status conditions (i.e., On/Off, warnings, etc.) of components in a system; microprocessors used by a system, etc.

As described herein, current bank 204d is an intelligent current bank from a set of intelligent current banks (204a-204d shown in FIG. 2). In one embodiment, one of the intelligent current banks from 204a-204d is identified by a comparator logic (e.g., processor 104 depicted in FIG. 1) as a "hot" intelligent current bank from the set of intelligent current banks, meaning that this "hot" intelligent current bank is providing more than a predetermined level of current to devices. In this embodiment, this predetermined level of current is a ratio of a first source current being provided by a first intelligent current bank to a second source current being provided by a second intelligent current bank. That is, assume that current bank 1 is providing 100 mA of current to its devices, and current bank 2 is providing 80 mA to its devices. In this scenario, assume that current bank 1 is providing more current than any of the other current banks from current banks 104, and that current bank 2 is providing the next most current to its devices (e.g., current bank 3 is only producing 30 mA and current bank 4 is only producing 10 mA). Thus, in this example, the ratio of current being provided by current bank 1 to current bank 2 would be 100/80, or 1.25. If 1.25 exceeds some predetermined ratio (e.g., 1.00), then a supply voltage level to the hot intelligent current bank is reduced by a current balancing logic (part of processor unit 104 and CIOCL 148 depicted in FIG. 1) until the supply voltage to the hot intelligent current bank reaches a point at which current from the hot intelligent current bank drops below the predetermined level of source current.

Note that in one embodiment, a thermal sensor 320 is coupled to current bank 204d. In this embodiment, it is the amount of heat rather than the current itself that dictates whether voltage to current bank 204d is reduced. For example, assume that the set of intelligent current banks depicted in FIG. 2 are coupled to an integrated circuit via a set of ball grid array (BGA) connectors. If any of these connections melt, due to the current bank 204d overheating from excess current flow, failure of the system is likely. This, in this embodiment the thermal sensor 320 (i.e., a thermal detector such as thermal sensor 152 depicted in FIG. 1), which in one embodiment is also coupled to the BGA connectors, detects if a particular intelligent current bank is "hot" (i.e., is a hot intelligent current bank that is exceeding a predetermined temperature). If the thermal sensor 320 determines that current bank 204d is running hot (e.g., over 200 degrees Celsius), then a current balancing logic (part of processor unit 104 and CIOCL 148 depicted in FIG. 1) reduces the supply voltage level to the hot intelligent current bank until the hot intelligent current bank drops below a predetermined "safe" (e.g., less than 100 degrees Celsius) temperature.

Figure 3:
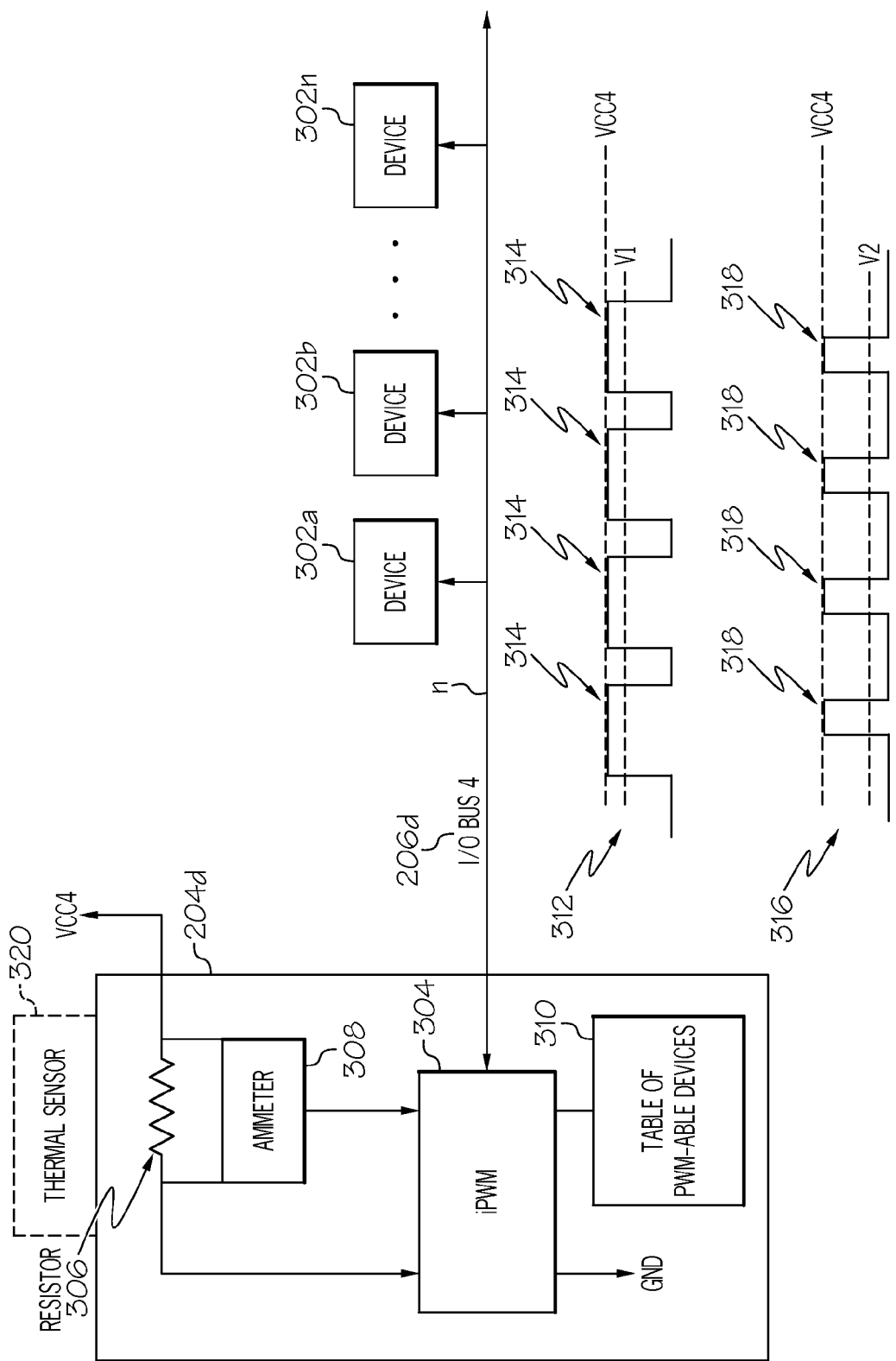
FIG. 3 depicts additional detail of one of the current banks illustrated in FIG. 2.
Figure 4:
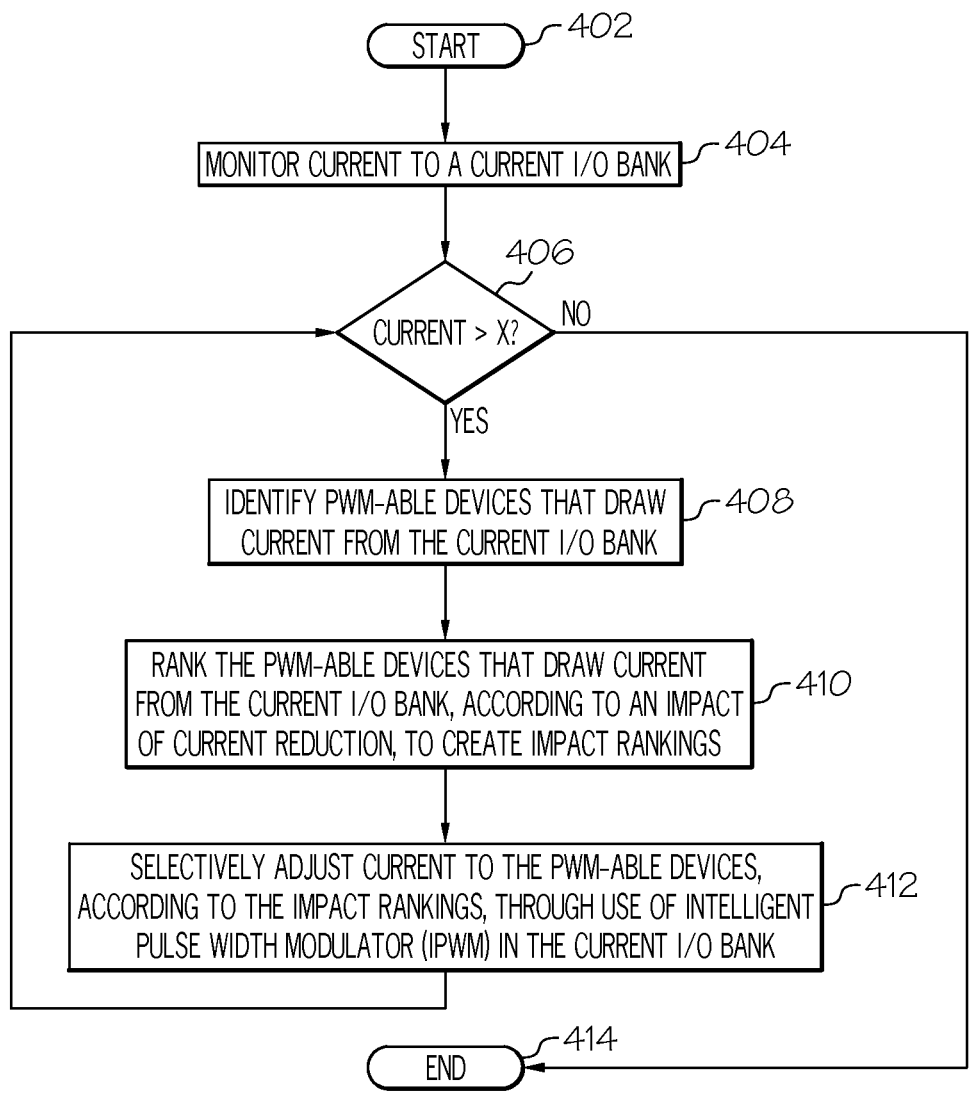
FIG. 4 is a high-level flow chart of exemplary steps performed by a system to selectively adjust current levels to devices on an I/O bus coming from a particular current bank.

With reference now to FIG. 4, a high-level flow chart of exemplary steps performed by a system to selectively adjust current levels to devices on an I/O bus coming from a particular current bank is presented. After initiator block 402, current to a current I/O bank (e.g., one or more of the banks 204a-204d depicted in FIG. 2), and/or the resulting current flowing out of a respective I/O bus (e.g., one or more of the I/O busses 206a-206d in FIG. 2) is monitored by measuring, by an ammeter, a real-time flow of current through a resistance that is coupled to a voltage source, as described in block 404 and presented in exemplary detail above in FIG. 3. As described in query block 406, a determination is made as to whether current flowing into and/or out of the current I/O bank exceeds some predetermined level "x". As described herein, this determination is performed in one embodiment by an intelligent Pulse-Width Modulation (iPWM) unit within the intelligent current bank and/or an ammeter, where the iPWM and/or ammeter determine whether the real-time flow of current (caused by a voltage source) through a resistance exceeds a predetermined amount.

As described in block 408, if the current entering/leaving a particular current I/O bank exceeds the predetermined level/amount, devices that are attached to the I/O bus are identified as being "willing" to have their current levels reduced if necessary. That is, certain devices on the I/O bus may have a constraint that their current/voltage can never be reduced, lest catastrophic results (e.g., failure of an entire system) ensues. Similarly, other devices may have their current/voltage supplies reduced, but only to a certain level, lest unacceptable conditions result. Thus, any device on the I/O bus that is able to have its current reduced, either partially or completely, is defined as a "PWM-able device", also known as a "PWM-able electronic device".

As described in block 410, different PWM-able devices are then ranked according to the impact that reducing their supply current will have on a system/operation/application/etc. For example, assume that one of the PWM-able devices is a cooling fan and another of the PWM-able devices is a Light Emitting Diode (LED). In this scenario, the cooling fan has a higher-priority rating and the LED has a lower-priority rating, such that current will be reduced to the LED before current is reduced to the cooling fan, since the cooling fan is more important to the proper operation of the total system of which the cooling fan and the LED are components. In another example, one of the electronic devices on the I/O bus is a microprocessor and another of the electronic devices on the I/O bus is a Light Emitting Diode (LED). Again the microprocessor has the higher-priority rating than the LED, causing current to be reduced to the LED before current is reduced to the microprocessor, since the microprocessor is also important to the proper operation of the total system of which the microprocessor and the LED are components. In some embodiments, the ranking of different components is not so clear cut. For example, in one embodiment the electronic devices coupled to the I/O include a primary memory, a processor, and a cooling fan. Ranking these items according to which devices are to have their current reduced, and by what amount, and in what order, is determined by an analysis of the overall system, the nominal performance ratings of the devices, and the interactive effect of one or more of the devices underperforming or failing. This analysis can be performed by a software analysis logic, which in one embodiment is a component of CIOCL 148 depicted in FIG. 1.

As described in block 412 of FIG. 4, in response to the iPWM and the ammeter determining that the real-time flow of current through the resistance being measured by the ammeter exceeds the predetermined amount, current is selectively decreased to at least one of one or more electronic devices coupled to the I/O bus. In one embodiment, current to at least one of the electronic devices is decreased by the iPWM shortening a duty cycle of voltage being received by the iPWM from the voltage source, as described in FIG. 3. The process ends at terminator block 414.

Thus, in one embodiment of the system and method described herein, one or more processors (e.g., part of processor unit 104 depicted in FIG. 4) establish a power priority rating for each of the electronic devices that are coupled to the I/O (current) bus coming from a particular current bank. This power priority rating establishes an order in which current is proportionately reduced to each of the electronic devices if the predetermined amount of current through the resistance is exceeded. Current is then selectively reduced, via the iPWM, to one or more of the electronic devices according to their respective power priority ratings, where current to a lower-priority electronic device is reduced before current to a higher-priority electronic device is reduced (i.e., the lower-priority electronic device has a lower power priority rating than the higher-priority electronic device).

Figure 5:
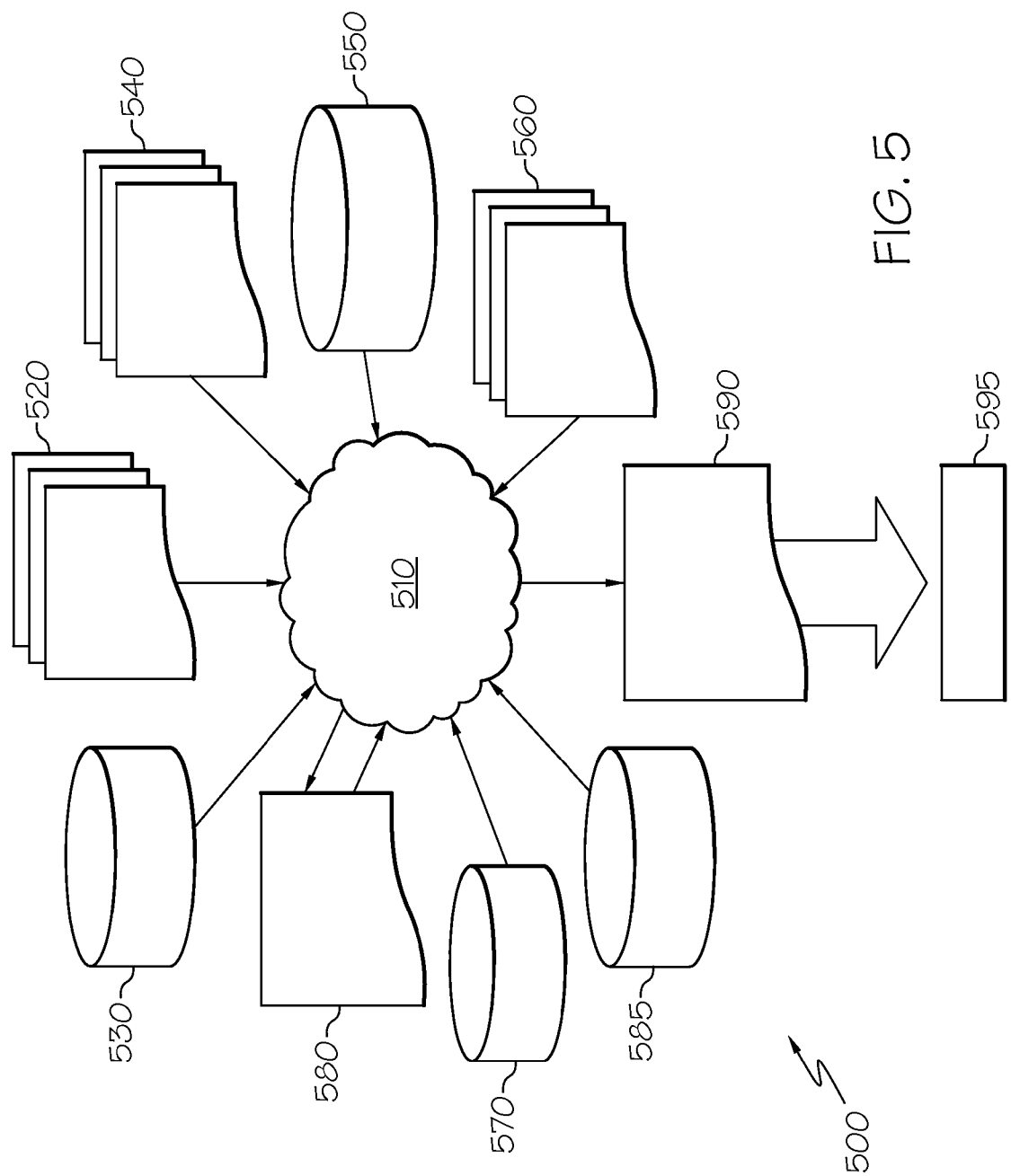
FIG. 5 is a flow diagram of a design process used in semiconductor design, manufacturing, and/or testing of the presently described exemplary system.

In one embodiment, the iPWM prevents one or more of said one or more electronic devices from experiencing a current reduction unless current to all other electronic devices from said one or more electronic devices is turned off With reference now to FIG. 5, there is depicted a block diagram of an exemplary design flow 500 used for example, in semiconductor IC logic design, simulation, testing, layout, and manufacturing. Design flow 500 includes processes, machines and/or mechanisms for processing design structures or devices to generate logically or otherwise functionally equivalent representations of the design structures and/or devices described above and shown in FIGS. 2-3. The design structures processed and/or generated by design flow 500 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 500 may vary depending on the type of representation being designed. For example, a design flow 500 for building an application specific IC (ASIC) may differ from a design flow 500 for designing a standard component or from a design flow 500 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 520 that is preferably processed by a design process 510. Design structure 520 may be a logical simulation design structure generated and processed by design process 510 to produce a logically equivalent functional representation of a hardware device. Design structure 520 may also or alternatively comprise data and/or program instructions that when processed by design process 510, generate a functional representation of the physical structure of a hardware device. Whether representing functional and/or structural design features, design structure 520 may be generated using electronic computer-aided design (ECAD) such as implemented by a core developer/designer. When encoded on a machine-readable data transmission, gate array, or storage medium, design structure 520 may be accessed and processed by one or more hardware and/or software modules within design process 510 to simulate or otherwise functionally represent an electronic component, circuit, electronic or logic module, apparatus, device, or system such as those shown in FIGS. 2-3. As such, design structure 520 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 510 preferably employs and incorporates hardware and/or software modules for synthesizing, translating, or otherwise processing a design/simulation functional equivalent of the components, circuits, devices, or logic structures shown in FIGS. 2-3 to generate a netlist 580 which may contain design structures such as design structure 520. Netlist 580 may comprise, for example, compiled or otherwise processed data structures representing a list of wires, discrete components, logic gates, control circuits, I/O devices, models, etc. that describes the connections to other elements and circuits in an integrated circuit design. Netlist 580 may be synthesized using an iterative process in which netlist 580 is resynthesized one or more times depending on design specifications and parameters for the device. As with other design structure types described herein, netlist 580 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 510 may include hardware and software modules for processing a variety of input data structure types including netlist 580. Such data structure types may reside, for example, within library elements 530 and include a set of commonly used elements, circuits, and devices, including models, layouts, and symbolic representations, for a given manufacturing technology (e.g., different technology nodes, 32 nm, 45 nm, 50 nm, etc.). The data structure types may further include design specifications 540, characterization data 550, verification data 560, design rules 570, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510 without deviating from the scope and spirit of the invention. Design process 510 may also include modules for performing standard circuit design processes such as timing analysis, verification, design rule checking, place and route operations, etc.

Design process 510 employs and incorporates logic and physical design tools such as HDL compilers and simulation model build tools to process design structure 520 together with some or all of the depicted supporting data structures along with any additional mechanical design or data (if applicable), to generate a second design structure 590. Design structure 590 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 520, design structure 590 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-3. In one embodiment, design structure 590 may comprise a compiled, executable HDL simulation model that functionally simulates the devices shown in FIGS. 2-3.

Design structure 590 may also employ a data format used for the exchange of layout data of integrated circuits and/or symbolic data format (e.g. information stored in a GDSII (GDS2), GL1, OASIS, map files, or any other suitable format for storing such design data structures). Design structure 590 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2-3. Design structure 590 may then proceed to a stage 595 where, for example, design structure 590: proceeds to tape-out, is released to manufacturing, is released to a mask house, is sent to another design house, is sent back to the customer, etc.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of controlling current to one or more devices in a hardware system, wherein the hardware system comprises a voltage source, an input/output (I/O) bus, and an intelligent current bank coupling the voltage source to the I/O bus, wherein the method comprises:
   measuring, by an ammeter, a real-time flow of current through a resistance that is coupled to the voltage source;
   determining, by an intelligent Pulse-Width Modulation (iPWM) unit within the intelligent current bank and the ammeter, whether the real-time flow of current through the resistance exceeds a predetermined amount; and
   in response to the iPWM and the ammeter determining that the real-time flow of current through the resistance being measured by the ammeter exceeds the predetermined amount, selectively decreasing current to at least one of one or more electronic devices coupled to the I/O bus, wherein current to said at least one of said one or more electronic devices is decreased by the iPWM shortening a duty cycle of voltage being received by the iPWM from the voltage source.

2. The method of claim 1, further comprising:
   establishing, by one or more processors, a power priority rating for each of the one or more electronic devices, wherein the power priority rating establishes an order in which current is proportionately reduced to each of the one or more electronic devices if the predetermined amount of current through the resistance is exceeded; and
   selectively reducing, via the iPWM, current to the one or more electronic devices according to power priority ratings, wherein current to a lower-priority electronic device is reduced before current to a higher-priority electronic device is reduced, wherein the lower-priority electronic device has a lower power priority rating than the higher-priority electronic device.

3. The method of claim 2, wherein the iPWM prevents one or more of said one or more electronic devices from experiencing a current reduction unless current to all other electronic devices from said one or more electronic devices is turned off.

4. The method of claim 2, wherein said one or more electronic devices comprise a cooling fan and a Light Emitting Diode (LED), and wherein the cooling fan has a higher power priority rating and the LED has the lower power priority rating.

5. The method of claim 2, wherein said one or more electronic devices comprise a microprocessor and a Light Emitting Diode (LED), and wherein the microprocessor has a higher power priority rating and the LED has the lower power priority rating.

6. The method of claim 1, wherein the I/O bus comprises multiple power lines, and wherein each of the multiple power lines is connected to a single electronic device from said one or more electronic devices.

7. The method of claim 1, wherein the voltage source is a direct current (DC) voltage source.

8. The method of claim 7, wherein the DC voltage source is a battery.

9. The method of claim 1, wherein the intelligent current bank is from a set of intelligent current banks, and wherein the method further comprises:
   identifying a hot intelligent current bank from the set of intelligent current banks, wherein the hot intelligent current bank is providing more than a predetermined level of current to devices, and wherein the predetermined level of current is a ratio of a first source current being provided by a first intelligent current bank to a second source current being provided by a second intelligent current bank; and
   reducing a supply voltage to the hot intelligent current bank until current from the hot intelligent current bank drops below the predetermined ratio of current.

10. The method of claim 9, wherein the set of intelligent current banks are coupled to an integrated circuit via a set of ball grid array (BGA) connectors, and wherein the method further comprises:
    detecting, by a thermal detector that is coupled to the BGA connectors, that the hot intelligent current bank is exceeding a predetermined temperature; and
    reducing the supply voltage to the hot intelligent current bank until the hot intelligent current bank drops below the predetermined temperature.

* * * * *